United States Patent
Takano et al.

(10) Patent No.: US 7,417,975 B2
(45) Date of Patent: Aug. 26, 2008

(54) CELLULAR SYSTEM AND BASE STATION SPECIFICATION METHOD IN CDMA MODE

(75) Inventors: Nahoko Takano, Tokyo (JP); Kojiro Hamabe, Tokyo (JP); Akihisa Ushirokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1224 days.

(21) Appl. No.: 10/078,003

(22) Filed: Feb. 20, 2002

(65) Prior Publication Data

US 2002/0114308 A1    Aug. 22, 2002

(30) Foreign Application Priority Data

Feb. 22, 2001    (JP) .............................. 2001-046422

(51) Int. Cl.
    *H04B 7/216*    (2006.01)
(52) U.S. Cl. ...................... 370/335; 370/342; 370/441; 370/328; 455/432.1
(58) Field of Classification Search ................. 370/328, 370/331, 332, 320, 335, 342, 441; 455/436–439, 455/442, 443, 432.1, 435.1
    See application file for complete search history.

(56) References Cited

U.S. PATENT DOCUMENTS

| | | | | |
|---|---|---|---|---|
| 5,379,451 A * | 1/1995 | Nakagoshi et al. | ........ | 455/435.1 |
| 5,640,414 A * | 6/1997 | Blakeney et al. | ............. | 375/130 |
| 5,854,981 A * | 12/1998 | Wallstedt et al. | ............. | 455/439 |
| 5,864,760 A * | 1/1999 | Gilhousen et al. | ........... | 455/442 |
| 6,141,555 A * | 10/2000 | Sato | ........................... | 455/437 |
| 6,154,653 A * | 11/2000 | Jung | .......................... | 455/442 |
| 6,198,928 B1 * | 3/2001 | Keurulainen et al. | ........ | 455/436 |
| 6,216,004 B1 * | 4/2001 | Tiedemann et al. | ......... | 455/442 |
| 6,363,255 B1 * | 3/2002 | Kuwahara | ................ | 455/456.5 |
| 6,456,606 B1 * | 9/2002 | Terasawa | .................... | 370/331 |
| 6,546,058 B1 * | 4/2003 | Gilhousen et al. | ........... | 375/285 |
| 6,574,211 B2 * | 6/2003 | Padovani et al. | ............. | 370/347 |
| 6,577,868 B1 * | 6/2003 | Vialen et al. | ................ | 455/441 |
| 6,714,788 B2 * | 3/2004 | Voyer | ......................... | 455/453 |

(Continued)

FOREIGN PATENT DOCUMENTS

JP    6-511609 A    12/1994

(Continued)

OTHER PUBLICATIONS

Japanese Patent Abstract of Japan Publication No. 11-069416, published Mar. 9, 1999.

*Primary Examiner*—Chi H. Pham
*Assistant Examiner*—Ahmed Elallam
(74) *Attorney, Agent, or Firm*—Sughrue Mion, PLLC

(57) ABSTRACT

To provide a cellular system for enhancing precision of judgement by rendering the number of code words to be judgement candidates at a base station as small as possible and thus improving the efficiency of using the code words.

A base station control unit notifies the base station of the maximum number of the base stations on which a mobile station may set up links to allow the base station to limit the code word judgement candidates that may be received. Accordingly, it is possible to increase the distance between the codes among the code words to be the judgement candidates, consequently allowing the base station to reduce judgement errors of the code word.

21 Claims, 14 Drawing Sheets

U.S. PATENT DOCUMENTS

| | | | |
|---|---|---|---|
| 6,728,227 B1 * | 4/2004 | Ohtani et al. | 370/331 |
| 6,757,536 B1 * | 6/2004 | Kim et al. | 455/436 |
| 6,895,246 B2 * | 5/2005 | Bonta | 455/442 |
| 7,006,828 B1 * | 2/2006 | Czaja et al. | 455/442 |
| 2002/0049058 A1 * | 4/2002 | Tee | 455/437 |
| 2002/0061749 A1 * | 5/2002 | Hunzinger | 455/436 |
| 2002/0177443 A1 * | 11/2002 | Tokuyoshi | 455/435 |

FOREIGN PATENT DOCUMENTS

| | | |
|---|---|---|
| JP | 10-509293 A | 9/1998 |
| KR | 2000-0039907 | 7/2000 |
| KR | 2000-0077329 | 12/2000 |
| KR | 2001-001981 | 6/2001 |
| WO | WO 00/57664 A1 | 9/2000 |

* cited by examiner

CELLULAR SYSTEM AND BASE STATION SPECIFICATION METHOD IN CDMA MODE

BACKGROUND OF THE INVENTION

1. Field of the Invention

The present invention relates to a cellular system and a base station specification method in cellular communication, and in particular, to the cellular system and the base station specification method wherein a mobile station specifies transmitting base stations from the base stations during soft handover in cellular communication.

2. Description of the Related Art

In a cellular system using the Direct Sequence-Code Division Multiple Access (DS-CDMA), a plurality of channels use the same frequency band so that radio waves of other channels become interference, and an increase in the interference deteriorates reception quality of a desired wave, which results in disconnection of a link and so on. Accordingly, the number of links, that is, a link capacity while maintaining required reception quality depends on an amount of the interference.

In an uplink, a signal transmitted by the mobile station located far from a base station has a higher attenuation factor of the power than a signal transmitted by the mobile station located close to the desired station, and so performing transmission by the same power causes a near-far problem wherein the interference wave becomes larger than the desired wave, resulting in a difficulty in communication. Accordingly, in the uplink, a transmit power control, which controls transmit powers of the mobile stations so as to render equal received powers of the signals from the mobile stations received at the base station, is required as an essential technology.

On the other hand, in a downlink, while such a near-far problem does not arise, the transmit power control is performed at the base station, to reduce the interference with the other channels, to the extent that the transmit power is the minimum required for maintaining the reception quality at the mobile stations as required quality. The transmit power control is a closed-loop type control. In the control, measured reception quality is compared to predetermined target quality, so that a Transmit Power Control (TPC) signal for giving an instruction to reduce the transmit power is transmitted if higher than the target quality, and TPC signal for giving an instruction to increase the transmit power is transmitted if lower than the target quality.

In addition, the technology called soft handover is usually used in the cellular system using the CDMA. This is the technology wherein, in the case where the mobile station approaches the vicinity of a cell boundary and a difference in propagation loss between the signal received from the base station in communication and the signal received from an adjacent base station is within a predetermined threshold, they are simultaneously connected so as to perform the transmission from a plurality of base stations. Thus, it is possible to improve the reception quality by a diversity effect due to the transmission from the plurality of base stations in the vicinity of the cell boundary where the propagation loss is significant and the reception quality is apt to deteriorate, and furthermore, it is possible to perform smooth handover with no hit because the link is set up, before disconnecting the link with the base station in communication, with the base station that is a next connection candidate.

In the downlink, however, there is a problem that the interference increases and the link capacity decreases during the soft handover since the plurality of base stations perform the transmission. To solve such a problem, Japanese Patent Laid-Open No. 11-69416 describes the technology for limiting the base stations for performing the transmission out of the base stations during the soft handover to reduce the interference of the downlink.

In this journal, the base stations transmit pilot signals at a predetermined power, and the mobile station measures the reception quality of the pilot signals transmitted by the base stations having the links set up, so that the base stations of high reception quality is determined as transmitting base stations and any station other than the transmitting base station stops at least some of the transmission.

A base station control unit for controlling the base stations having the links set up determines base station identifiers of the plurality of base stations for having the links set up respectively when the mobile station starts the soft handover. Moreover, the above base station identifiers are base station unique information for identifying individual base stations. In the base station control unit, code words representing combinations of the base station identifiers are defined, and the base stations and the mobile station have such information.

The mobile station transmits the code word representing the combination of the base station identifiers of the base stations determined as the transmitting base stations to the base stations having the links set up. The base station having the link set up judges which defined code words the received code word is, and judges from a table indicating correspondence between the code words and the base station identifiers whether the base station identifier of the base station is included.

Consequently, the base station judges itself to be the transmitting base station, in the case where the base station identifier of the station is included. Then, the base station performs the transmission by the downlink. On the other hand, in the case where the base station identifier of the base station is not included, the station stops the transmission. Thus, it is possible to have the transmission performed only by the base stations of little propagation loss, so that the interference with the downlink decreases and the link capacity is expected to increase.

However, there are the cases where the base stations having the links set up wrongly receive the signals depending on a state of a propagation path. In the case where, in the base station specified as the transmitting base station, an error arises in the received code word and it is not decoded as a correct code word in spite of using error correction or the like and it is mistakenly determined as a different code word, it is thinkable that the base station judges itself to be a non-transmitting base station and stops the transmission. In such as case, the above described base station stops the transmission throughout an update period of the transmitting base station, the reception quality of the down link deteriorates. In particular, in the case where only one transmitting base station is specified, when the transmitting base station judges wrongly itself to be the non-transmitting base station, the reception quality of the downlink deteriorates remarkably since all the base stations stop the transmission.

To reduce such wrong reception of the code word in the base stations, redundancy should be enhanced by rendering a distance between the codes among the code words as large as possible. In the case where the number of bits of the code word to be transmitted on the uplink is limited, however, the more code words to be judgement candidates there are, the smaller the distance between the codes becomes. The necessary code words increase in proportion to the number of defined base station identifiers. While the base stations have information on the defined code words corresponding to all the combinations of the base station identifiers in advance, all the base station identifiers may not necessarily be used in reality. Accordingly, the base stations make a judgement by using all the defined code words as subjects of the judgement candidates, even though there are the code words with no possibility to be transmitted by the mobile station. Consequently, there is a problem of increasing wrong judgements.

In addition, the probability is high that two or three base stations have the links set up, and so it is less likely that more base stations simultaneously have the links set up. In the case of defining the code words corresponding to the combinations of the transmitting base stations of such a low probability of occurrence, there is also a problem that efficiency of using the code words is very poor since the probability of wrong judgement becomes higher due to the increased number of the code words in spite of a very low frequency of use.

SUMMARY OF THE INVENTION

Accordingly, an object of the present invention is to enhance precision of the judgement by rendering the number of the code words to be judgement candidates at the base stations as small as possible and thus improving the efficiency of using the code words.

The present invention implemented to solve the above problem is a cellular system in a code division multiple access mode comprising: a mobile station for measuring reception quality of pilot signals transmitted by a plurality of base stations and setting up radio links; a base station control unit for assigning code words and base station identifiers that are unique information of the base stations and determining sequence information on the base station identifiers; and base stations for checking the code word transmitted from the mobile station having the radio link set up against a table created based on correspondence between said assigned code words and said assigned base station identifiers and said sequence information and determining a transmitting base station, wherein said base station control unit has means for notifying said base station, in advance, of said assigned code words and said assigned base station identifiers and said sequence information, and said base station has means for judging whether or not the base station itself is specified as the transmitting base station by creating in advance code word candidates that may be transmitted by the mobile station based on said assigned base station identifiers and said sequence information and checking the code word received from the mobile station against said code word candidates.

In addition, the maximum number of the base stations on which the mobile station may set up the links is used as said sequence information.

Moreover, a set of the base station identifiers that may be used according to the maximum number of the base stations on which the mobile station may set up the links is used as said sequence information.

In addition, the number of the base stations on which the mobile station currently has the links set up is used as said sequence information.

Moreover, a set of the base station identifiers used by the base stations currently having the links set up is used as said sequence information.

In addition, according to the present invention, a cellular system in a code division multiple access mode comprising a mobile station for measuring reception quality of pilot signals transmitted by a plurality of base stations and setting up radio links; a base station control unit for assigning code words and base station identifiers that are unique information of the base stations thereunder and determining a predetermined base station number threshold; and base stations for checking the code word transmitted from the mobile station having the radio link set up against a table created based on correspondence between said assigned code words and said assigned base station identifiers and said base station number threshold and determining a transmitting base station, said base station control unit has means for, in the case where the mobile station sets up links with the base stations equal to or exceeding said base station number threshold, duplicatively assigning the same base station identifier and notifying said base station, in advance, of said duplicatively assigned base station identifier, said assigned code words and said base station number threshold, and said base station has means for, in the case where the mobile station sets up links with the base stations equal to or exceeding said base station number threshold, judging whether or not the base station itself is specified as the transmitting base station by creating in advance code word candidates that may be sent by the mobile station based on said duplicatively assigned base station identifier and said base station number threshold and checking the code word received from the mobile station against said code word candidates.

DESCRIPTION OF THE PREFERRED EMBODIMENTS

Figure 1:
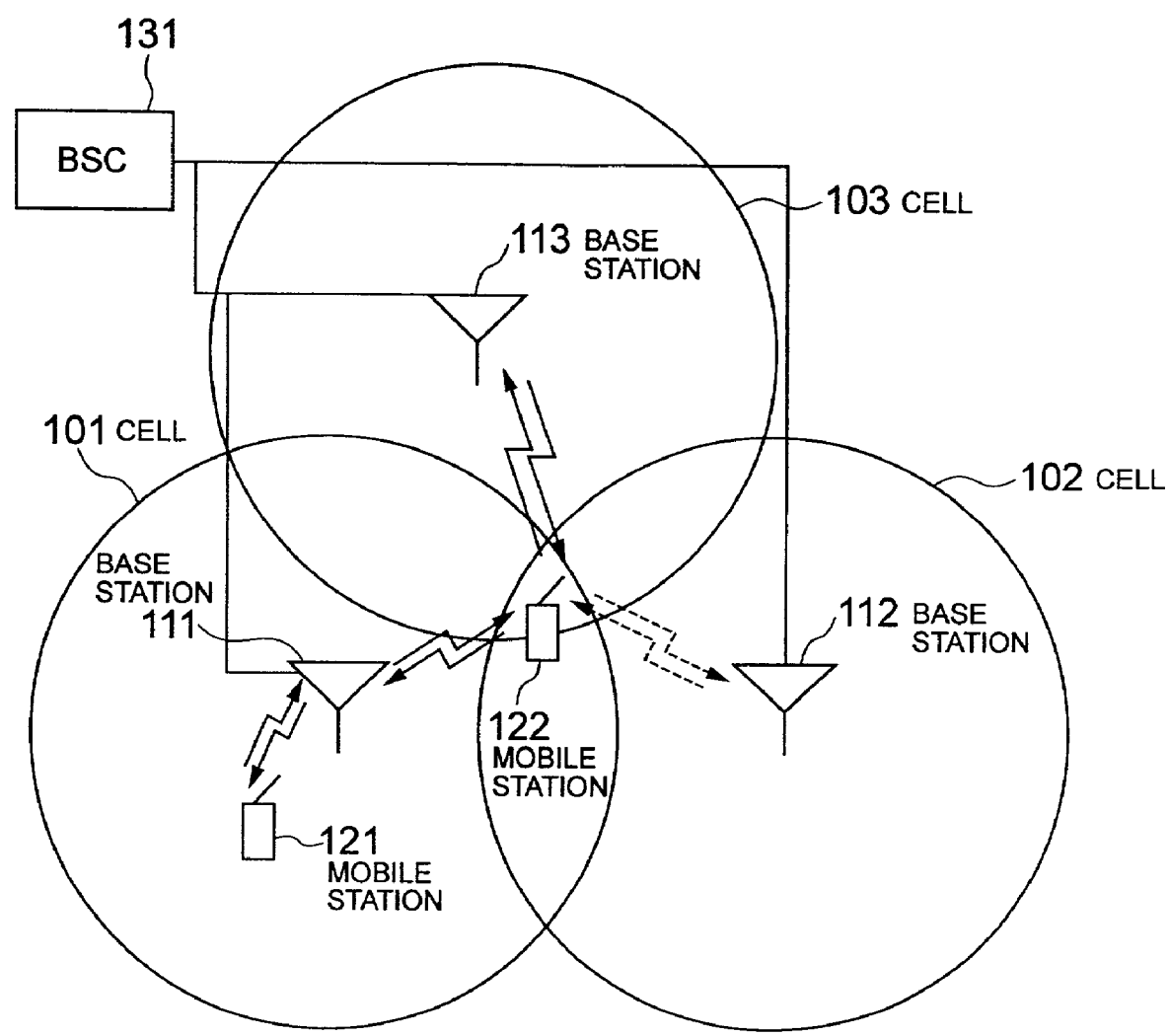
FIG. 1 is a diagram showing a construction of a cellular system to which the present invention is applied.

The embodiments of the present invention will be described hereafter by referring to the drawings. In a cellular system using a DS-CDMA mode, a mobile station has a link set up with in one base station or a plurality of base stations, and measures receiving levels of pilot signals sent by the base stations having the links set up, and determines one transmitting base station or a plurality of transmitting base stations for performing transmission according to measuring results thereof so as to transmit to each base station having the link set up a code word indicating a combination of the transmitting base stations. The base station having the link set up receives the code word, and performs the transmission by a downlink in the case where the base station identifier of the base station is included, and stops at least some of the transmission in the case where the base station is not specified as the transmitting base station, namely, the base station is a non-transmitting base station.

FIG. 1 is a diagram showing a construction of the cellular system to which the present invention is applied. As shown in FIG. 1, base stations 111 to 113 are performing the transmission to mobile stations 121 and 122 in the range of cells 101 to 103. Each base station is connected to a base station control unit (BSC) 131. In addition, each base station is transmitting a common pilot signal of a predetermined power value covering all the mobile stations in the cell and an individual signal covering each mobile station, and the mobile station is transmitting the individual signal to the base station having the link set up. These transmit power values are controlled by transmit power control of a high-speed closed-loop type.

The mobile station sets up the links with the base station of which receiving level of the common pilot signal transmitted by each base station is maximum and the base station of which difference in the receiving level from the above described base station is within a predetermined threshold. The base station control unit assigns the base station identifier to each base station when the mobile station sets up links with the plurality of base stations, notifies base stations having the links set up of the assigned base station identifiers respectively, and also notifies the mobile station of all the assigned base station identifiers via the base stations. The mobile station periodically specifies the transmitting base stations to the base stations under a predetermined condition in decreasing order of the receiving level of the common pilot signal, and notifies each base station having the link set up thereof by transmitting on the uplink the predetermined code word indicating the combination of the base station identifiers of the specified base stations.

The mobile station 121 located near the center of the cell 101 has the link set up only with the base station 111 because the receiving level of the common pilot signal transmitted by the base station 111 is the best and the differences in the receiving levels of the common pilot signals transmitted by the other base stations are not within the predetermined threshold. In addition, the mobile station 122 located near the boundaries of the cells 101, 102 and 103 has the links set up simultaneously with the base stations 111, 112 and 113 because the differences in the receiving levels of the common pilot signals transmitted by the base stations 111, 112 and 113 are within the predetermined threshold. Therefore, the base station identifiers are assigned to the base stations 111, 112 and 113 respectively. However, as the base station 112 does not meet the predetermined condition for determining the transmitting base station, the mobile station 122 transmits the code word indicating the combination of the base station identifiers of the base stations 111 and 113 by using the individual signals of the uplinks. The base stations 111, 112 and 113 having the links set up receive the code word transmitted by the mobile station 122, and judge the received code word on the basis of the code word candidates that may be transmitted by the mobile station 122, and then determine the combination of the base station identifiers associated with the received code word in advance. Consequently, the base stations 111 and 113 judge themselves to be the transmitting base stations, that is, the base stations 111 and 113 are specified as the transmitting base stations. Therefore, the base stations 111 and 113 transmit the individual signals, and the base station 112 judges itself to be the non-transmitting base station so as to stop transmitting of the individual signal.

Thus, in the present invention, a base station or each of base stations is specified as the transmitting base station. This means that a cell in the base station specified as the transmitting base station is specified as a transmitting cell.

Figure 2:
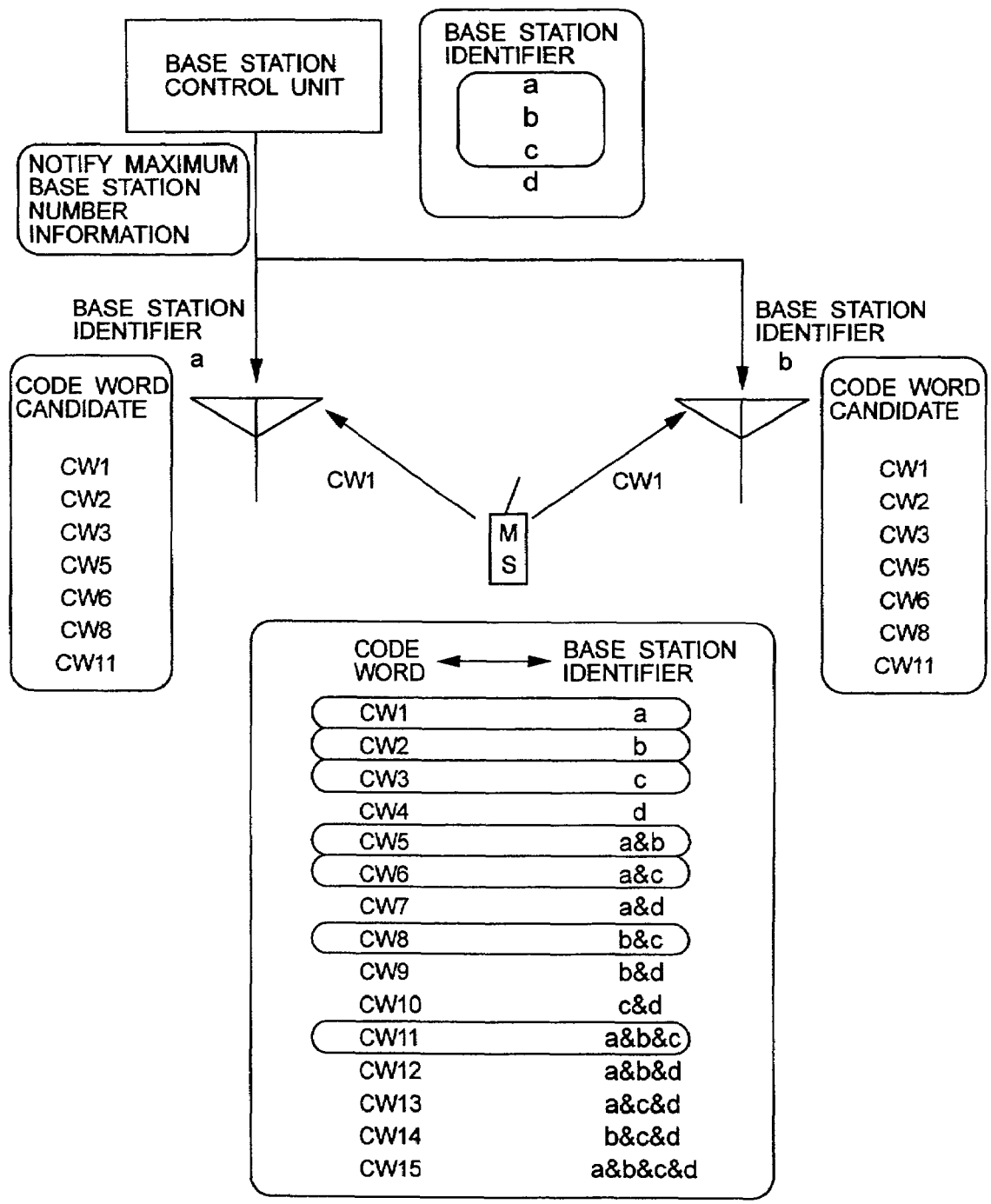
FIG. 2 is a diagram showing a principle that forms the basis of a first embodiment of the present invention.

A first embodiment of the present invention will be described hereafter. FIG. 2 is a diagram showing a principle that is the basis of the first embodiment of the present invention. As shown in FIG. 2, in the first embodiment, the base station control unit notifies the base stations to have the links set up of the maximum base station number that is the maximum number of base stations on which the mobile station may simultaneously set up the links. In FIG. 2, the maximum base station number is three, and on setting up the links, the base station control unit notifies information on the maximum base station number as well as the base station identifier of each base station. The order of assigning the base station identifiers is determined in advance, and the base station control unit and the base stations have information on this order. Accordingly, each base station having the link set up can determine the base station identifiers that may be used on notification of the maximum base station number information. In the case of FIG. 2, as the maximum base station a number is three, it can be determined that there are three base station identifiers a, b and c that may be used, and so the base stations can limit the code words that may be transmitted from the mobile station only to the code words indicating combinations of those base station identifiers. Accordingly, from among the fifteen code words defined in FIG. 2, each base station can limit judgement candidates (which are the code words that may be transmitted from the mobile station) to seven code words (CW1, CW2, CW3, CW5, CW6, CW8 and CW11), consequently reducing an error rate of the judgement.

In addition, as the example of the code word transmitted by the mobile station in FIG. 2 is the CW1, only the base station of the base station identifier a is transmitting the individual signal in this case, and the base station of the base station identifier b is stopping transmitting it. Moreover, in order for the mobile station in FIG. 2 to have the individual signals sent from the two base stations in the figure, the mobile station should transmit the CW5 (the base station identifier a and the base station identifier b).

Figure 3:
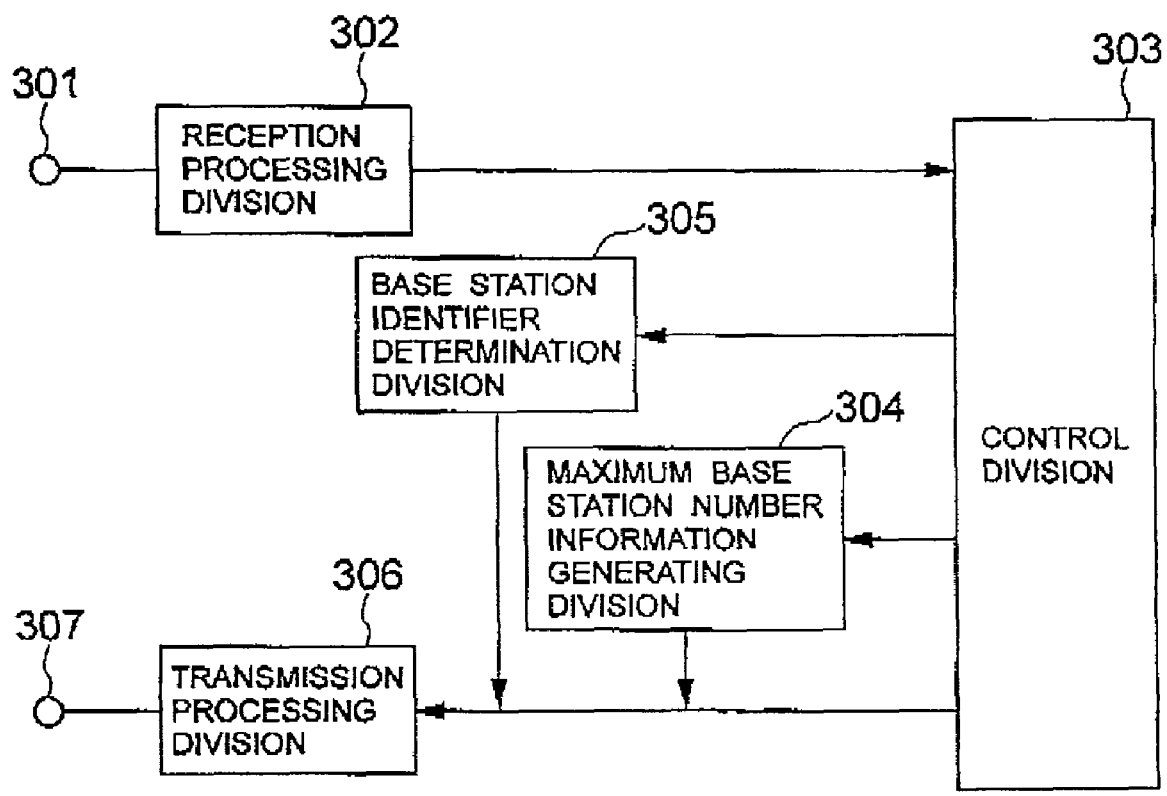
FIG. 3 is a block diagram showing a construction of a base station control unit according to the first embodiment.

FIG. 3 is a block diagram showing a construction of the base station control unit according to the first embodiment. As shown in FIG. 3, the base station control unit is comprised of an input terminal 301 for receiving the signals transmitted from the base stations, a reception processing division 302, a control division 303 for performing various control on transmission and reception of the base station, a maximum base station number information generating division 304, a base station identifier determination division 305 for determining the base station identifiers of the base stations to have the links setup, a transmission processing division 306 and an output terminal 307 for transmitting the signals to each base station.

The maximum base station number information generating division 304 extracts from the control division 303 the information on the maximum number of the base stations on which the mobile station may set up the links, generates the signal to be notified to the base stations, and when a new base station has the link set up, notifies it by multiplexing it into output data. The base station identifier determination division 305 determines the base station identifier of the base station to newly have the link set up in predetermined order, generates the signal notifying the information on the determined base station identifier, and notifies the applicable base station thereof by multiplexing it into output data.

Figure 4:
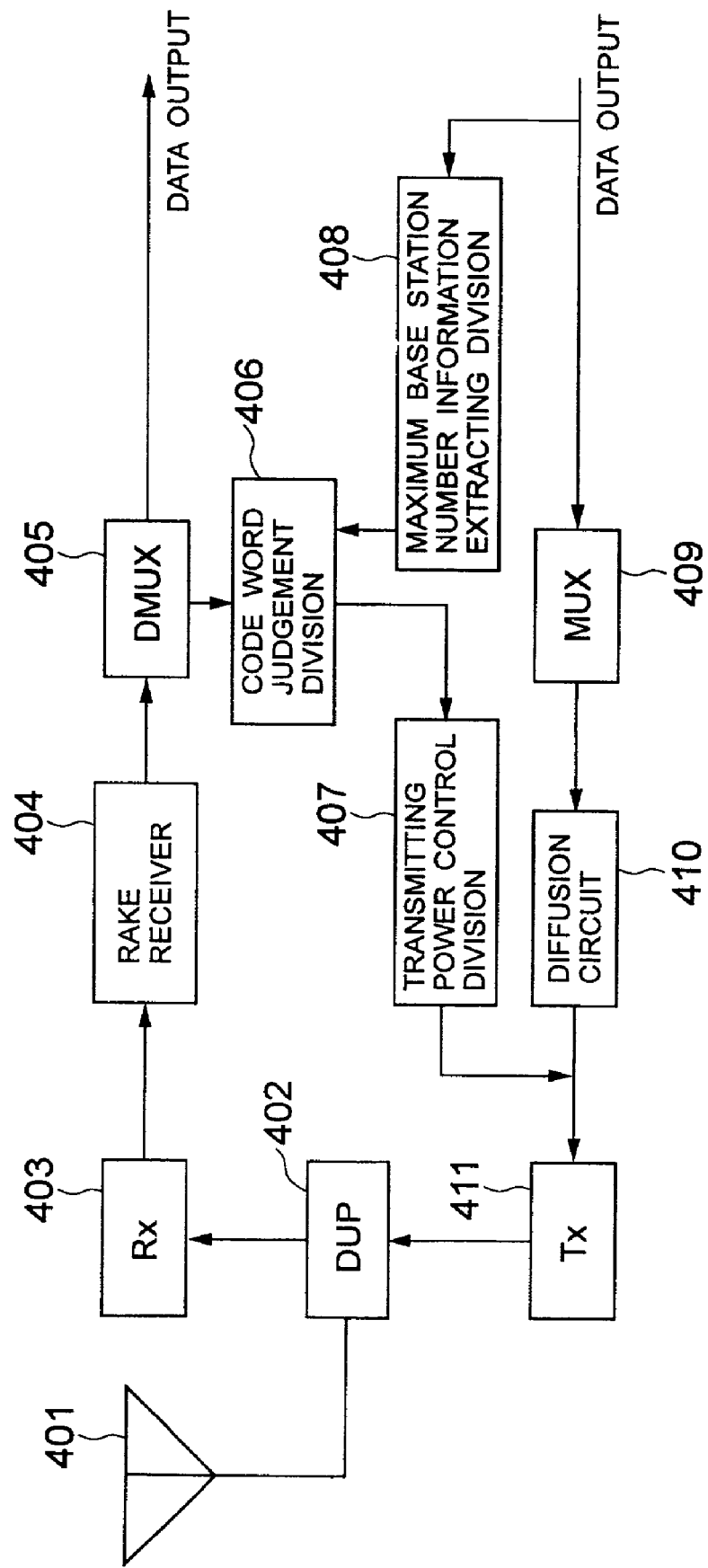
FIG. 4 is a block diagram showing a construction of a base station according to the first embodiment.

FIG. 4 is a block diagram showing a construction of the base station according to the first embodiment. As shown in FIG. 4, the base station is comprised of an antenna 401 for receiving the signals transmitted from the mobile station, a duplexer (DUP) 402, a radio receiving division (Rx) 403 for converting a radio signal into a receiving base band signal, a RAKE receiver 404 for synthesizing the base signals, a demultiplexer (DMUX) 405, a code word judgement division 406, a transmit power control division 407 for controlling the transmit power of the base station, a maximum base station number information extracting division 408, a multiplexer (MUX) 409, diffusion circuit 410 for diffusing the downlink signal and outputting a transmission base signal, and a radio transmission division (Tx) 411 for converting the transmission base signal into the radio signal and transmitting it.

The maximum base station number information extracting division 408 extracts the information on the maximum base station number notified from the base station control unit, determines a set of the base station identifiers that maybe used, and notifies the code word judgement division 406 of information on the determined set. In the case of FIG. 2, the determined set includes the base station identifiers a, b and c. The code word judgement division 406 extracts from the demultiplexer 405 the code word transmitted from the mobile station, and determines the code word judgement candidates based on the information notified from the maximum base station number information extracting division 408. Then the code word judgement division 406 judges the received code word based on the code word judgement candidates so as to judge whether or not its base station is the transmitting base station and send judgement results to the transmit power control division 407. The transmit power control division 407 performs the transmission if its base station is the transmitting base station, and stops the transmission if it is the non-transmitting base station.

Thus, according to the first embodiment of the present invention, the base station control unit notifies each base station of the maximum number of the base stations on which the mobile station may set up the links to allow each base station to limit the code word judgement candidates which are the code words that may be received. Accordingly, it is possible to increase the distance between codes among the code words to be the judgement candidates, consequently allowing the base station to reduce judgement errors of the code word. In addition, it reduces the probability that the transmitting base station judges itself to be the non-transmitting base station and stops the transmission due to the judgement error so that the reception quality of the downlink can be improved.

A second embodiment of the present invention will be described hereafter. The principle that forms the basis of the second embodiment is, in the base stations for having the links set up just as in the first embodiment, to reduce the judgement errors by limiting the judgement candidates used for judging the received code word, based on the information determined from the maximum number of the base stations on which the mobile station may set up the links. As for the difference between the second embodiment and the first embodiment, in the first embodiment, each base station has in advance the information on the order of the base station identifiers that the base station control unit assigns to the base stations having the links set up, and if the base station control unit notifies each base station of the information on the maximum base station number, each base station determines the base station identifiers that may be used from the information on the order. On the other hand, in the second embodiment, the base station does not have the information on the order of assigning the base station identifiers. Instead, in the second embodiment, the base station control unit determines the set of the base station identifiers that may be used according to the maximum base station number, and notifies the base stations of the information on the base station identifiers that may be used.

Figure 5:
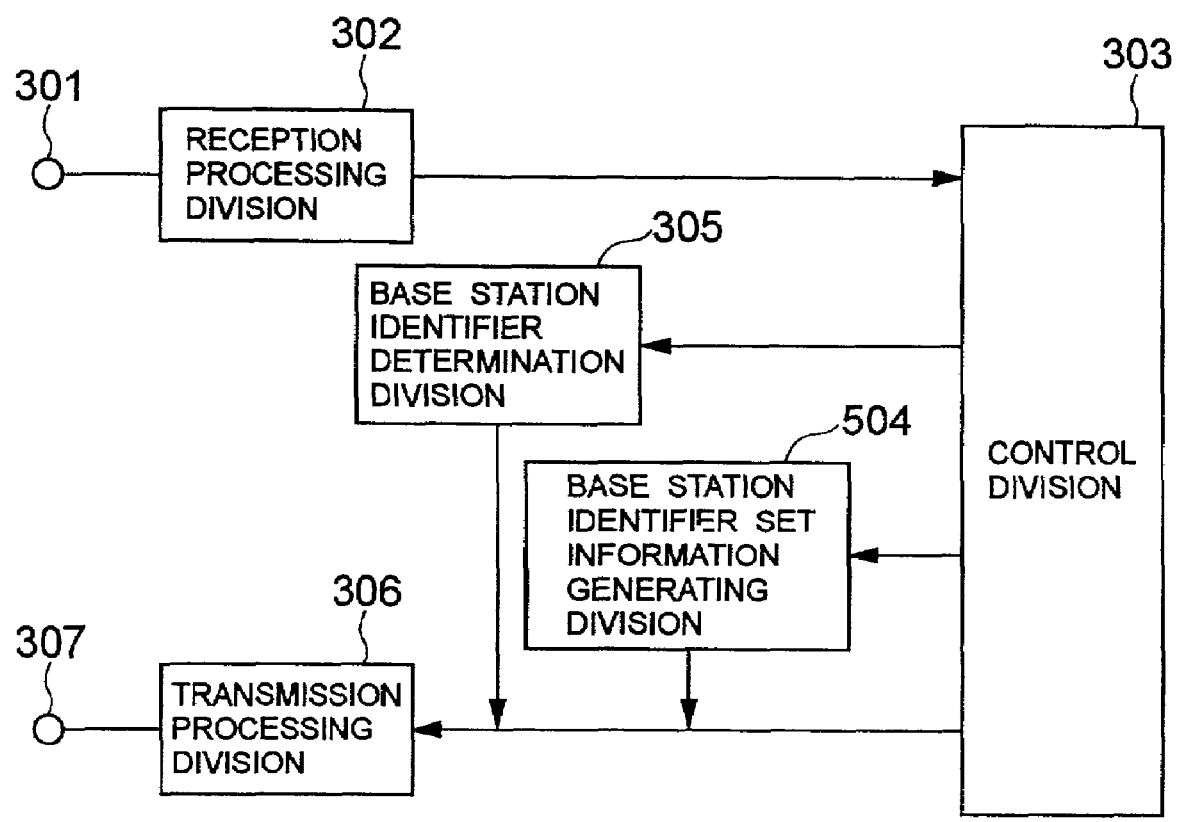
FIG. 5 is a block diagram showing a construction of a base station control unit according to a second embodiment of the present invention.
Figure 6:
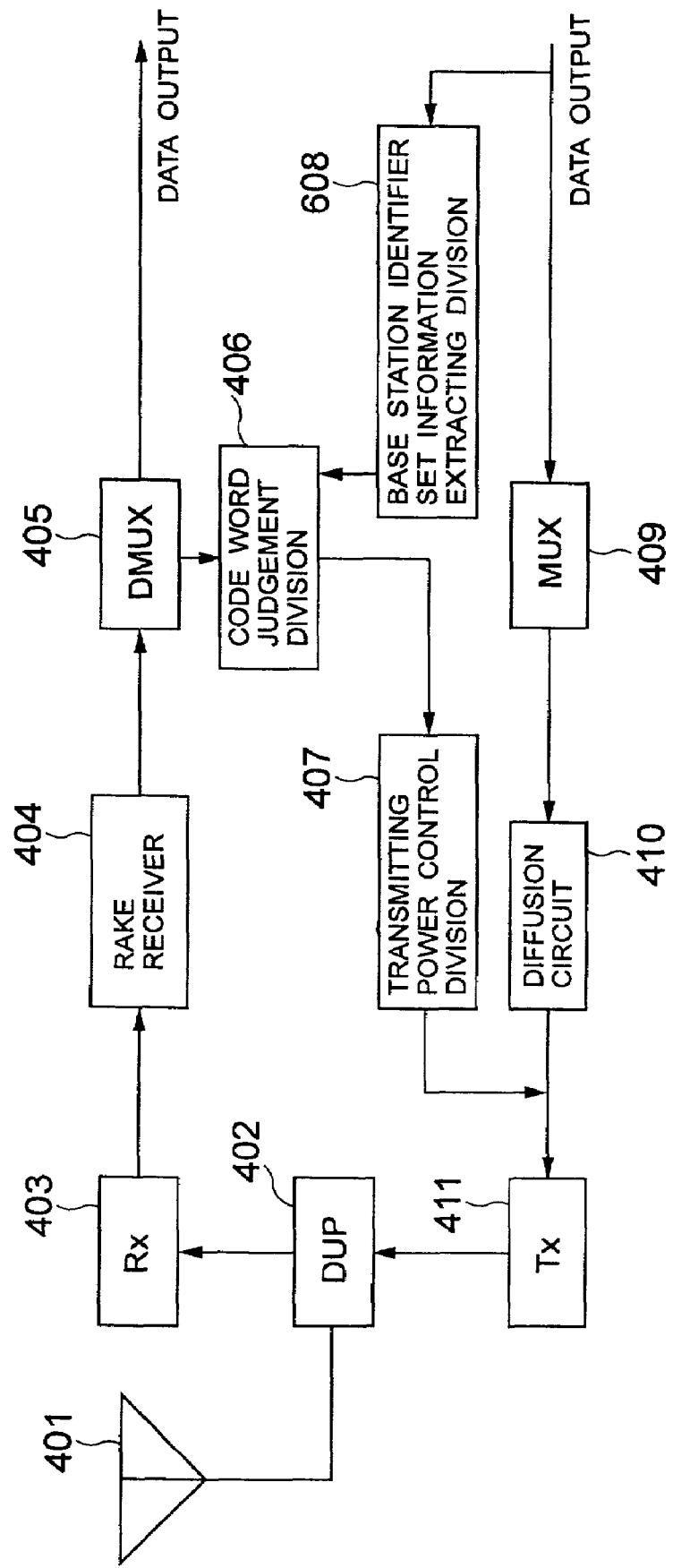
FIG. 6 is a block diagram showing a construction of a base station according to the second embodiment.

FIGS. 5 and 6 are block diagrams showing the configurations of the base station control unit and the base station according to the second embodiment respectively, and the portions corresponding to FIGS. 3 and 4 are numbered likewise and duplicative descriptions are omitted. In addition, the cellular system to which this embodiment is applied is the same as that in FIG. 1. As shown in FIG. 5, the base station control unit does not have the maximum base station number information generating division 304 that the unit shown in FIG. 3 has. Instead, it has a base station identifier set information generating division 504 that the unit in FIG. 3 does not have.

The base station identifier set information generating division 504 determines the set of the base station identifiers that may be used according to the maximum number of the base stations on which the mobile station may set up the links, generates a signal for notifying that information, and notifies it by multiplexing it into the output data to the base stations to have the links newly set up. The operations of the other components in FIG. 5 are performed just as the operation of the base station control unit in FIG. 3.

As shown in FIG. 6, the base station does not have the maximum base station number information extracting division 408 that the base station shown in FIG. 4 has. Instead, it has a base station identifier set information extracting division 608 that the base station shown in FIG. 4 does not have. The base station identifier set information extracting division 608 extracts the information on the set of the base station identifiers notified from the base station control unit and sends it to the code word judgement division 406. The operations of the other components in FIG. 6 are performed just as the operation of the base station in FIG. 4.

Thus, according to the second embodiment of the present invention, the base station control unit determines the set of the base station identifiers that may be used according to the maximum number of the base stations on which the mobile station may set up the links, and notifies the base stations for having the links set up thereof. The base station can limit the code words judgement candidates which are the code words that may be received based on that information. Accordingly, it is possible to increase the distance between the codes among the code words to be the judgement candidates so as to consequently reduce the judgement errors of the code word in the base station. Thus, it reduces the probability that the transmitting base station judges itself to be the non-transmitting base station and stops the transmission due to the judgement error so that the reception quality of the downlink can be improved.

Figure 7:
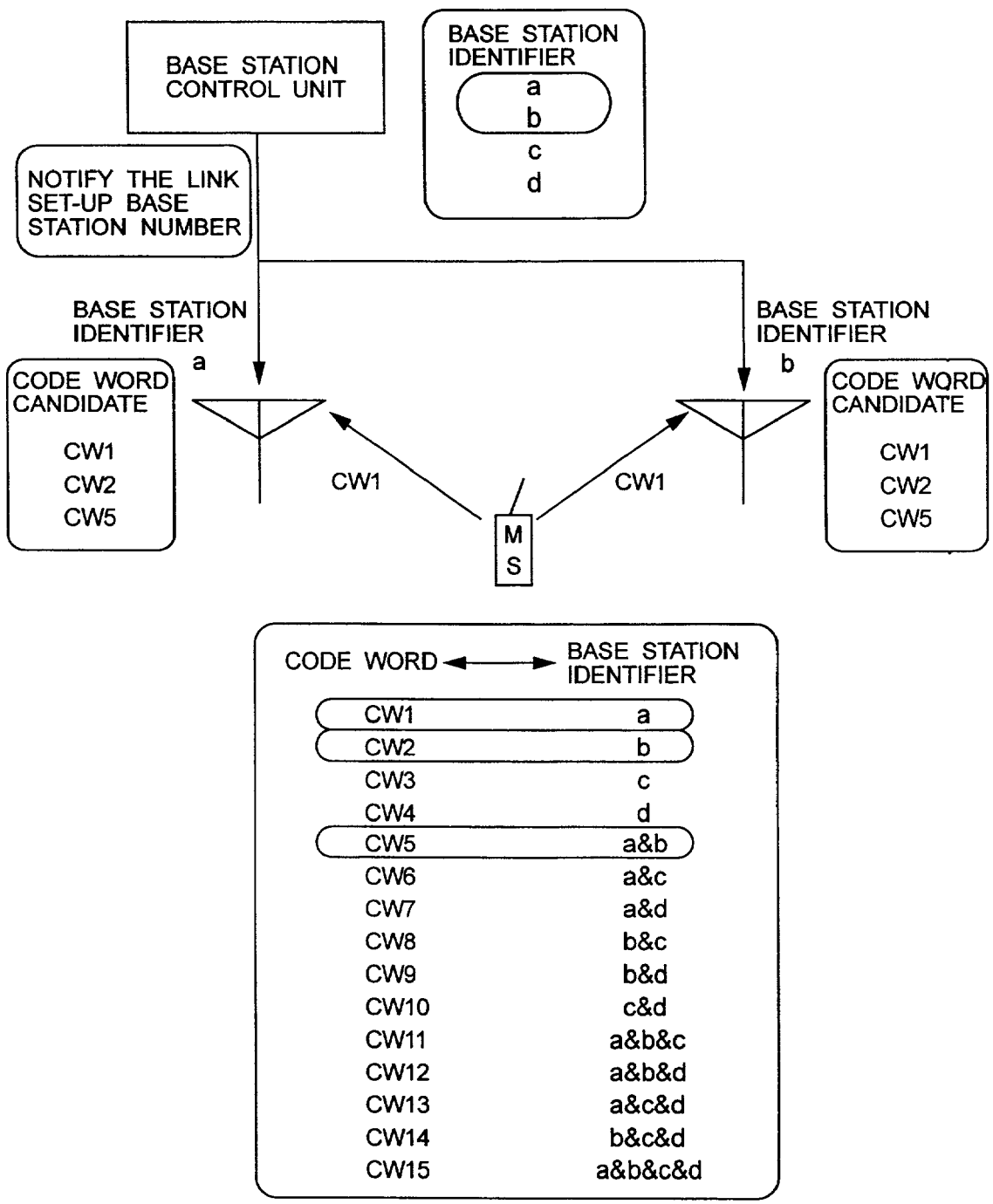
FIG. 7 is a diagram showing a principle that forms the basis of a third embodiment of the present invention.

A third embodiment of the present invention will be described hereafter. FIG. 7 is a diagram showing the principle that forms the basis of the third embodiment. In the third embodiment, the base station control unit notifies the base stations having the links set up of the link set-up base station number that is the number of the base stations currently having the links set up by the mobile station. In FIG. 7, the mobile station has links set up with two base stations, where the base station control unit notifies the information on the link set-up base station number each time the number changes. The base station identifiers are assigned in predetermined order, and the base station control unit and the base stations have the information on this order. Accordingly, each base station having the link set up can determine the base station identifiers that is currently used if it is notified of the information on the link set-up base station number. In the case of FIG. 7, the link set-up base station number is two, and so each base station can determine that the two base station identifiers that are currently used are a and b, so that the code words that may be transmitted from the mobile station can be limited to the code words showing combinations of the base station identifiers a and b. Accordingly, each base station can limit the judgement candidates, of the fifteen code words defined in FIG. 7, to three code words (CW1, CW2, CW5) so as to consequently reduce the error rate of the judgement.

In addition, as the example of the code word that the mobile station in FIG. 7 is transmitting is CW1, only the base station of the base station identifier a is transmitting the individual signal in this case, and the base station of the base station identifier b is stopping transmitting it. Moreover, for the mobile station in FIG. 7 to have the individual signal sent from the two base stations in the figure, the mobile station should transmit the CW5 (the base station identifiers a and b).

Figure 8:
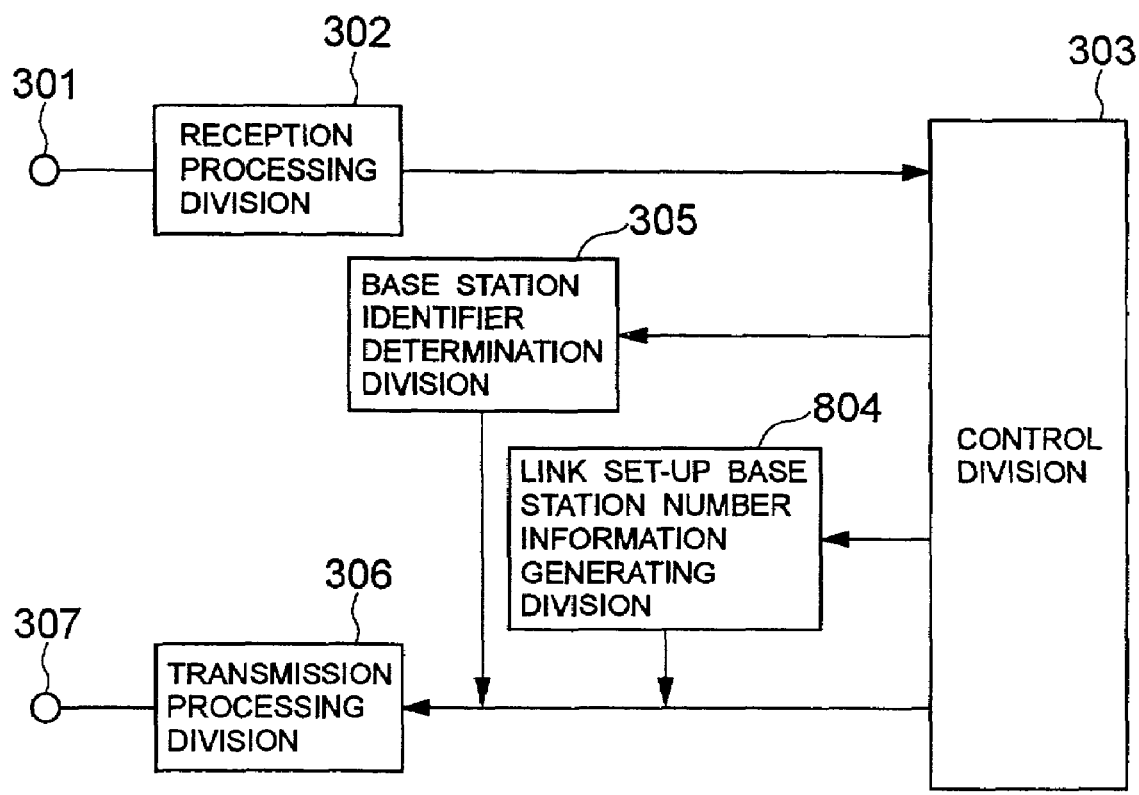
FIG. 8 is a block diagram showing a construction of a base station control unit according to the third embodiment.
Figure 9:
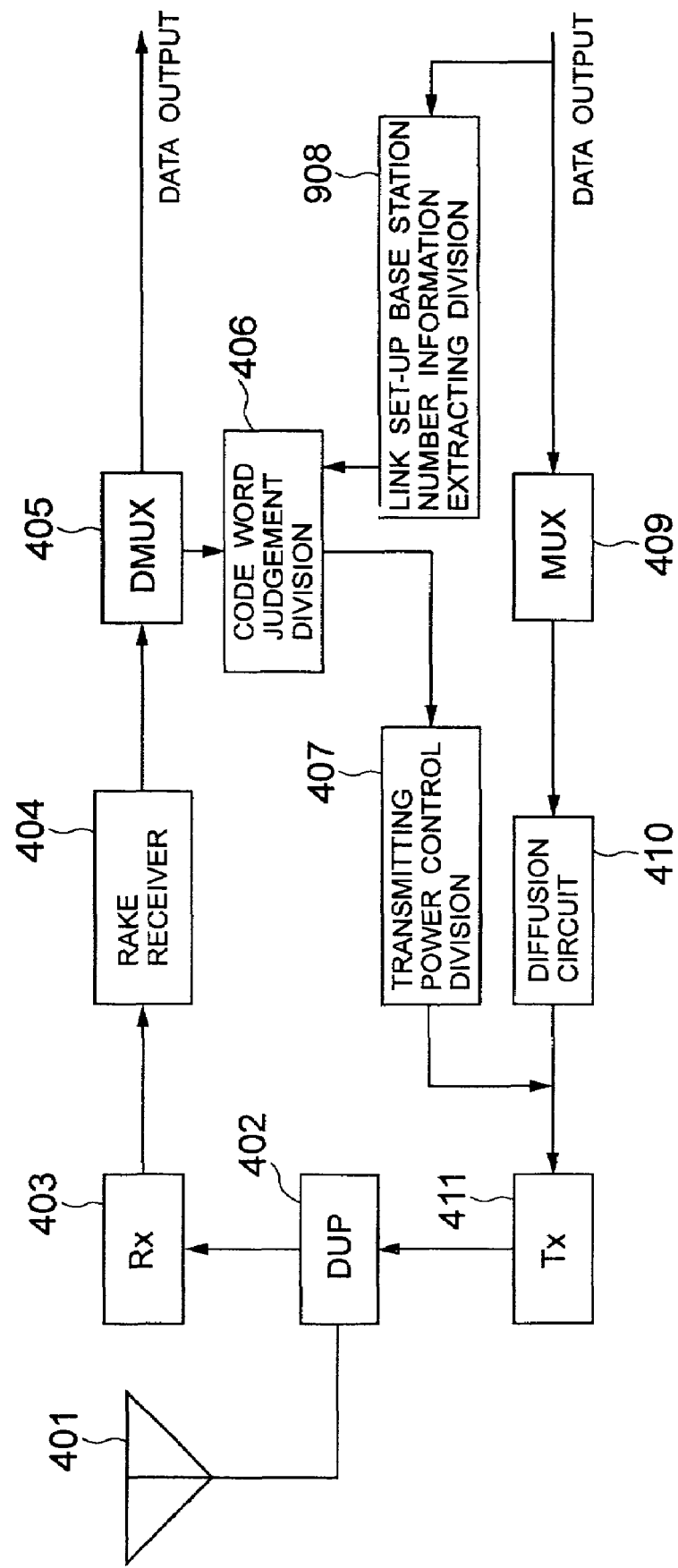
FIG. 9 is a block diagram showing a construction of a base station according to the third embodiment.

FIGS. 8 and 9 are block diagrams showing the configurations of the base station control unit and the base station according to the third embodiment respectively, and the portions corresponding to FIGS. 3 and 4 are numbered likewise and duplicative descriptions are omitted. In addition, the cellular system to which this embodiment is applied is the same as that in FIG. 1.

As shown in FIG. 8, the base station control unit does not have the maximum base station number information generating division 304 that the unit shown in FIG. 3 has. Instead, it has a link set-up base station number information generating division 804 that the unit in FIG. 3 does not have.

The link set-up base station number information generating division 804 generates a signal for notifying the information on the number of the base stations currently having the links set up by the mobile station each time the number changes and notifies it by multiplexing it into the output data to each base station having the link set up. The operations of the other components in FIG. 8 are performed just as the operation of the base station control unit in FIG. 3.

As shown in FIG. 9, the base station does not have the maximum base station number information extracting division 408 that the base station shown in FIG. 4 has. Instead, it has a link set-up base station number information extracting division 908 that the base station shown in FIG. 4 does not have.

The link set-up base station number information extracting division 908 extracts the information on the link set-up base station number notified from the base station control unit. Each base station has in advance the information on the order of the base station identifiers that the base station control unit assigns to the base stations to have the links set up, and the link set-up base station number information extracting division 908 determines the base station identifiers that is currently used based on such information and notifies the code word judgement division 406 thereof. The operations of the other components in FIG. 9 are performed just as the operation of the base station in FIG. 4.

Thus, according to the third embodiment of the present invention, the base station control unit notifies each base station of the number of the base stations on which the mobile station is currently setting up the links to allow each base station to limit the code word judgement candidates that may be received. Accordingly, it is possible to increase the distance between the codes among the code words to be the judges candidates, consequently allowing the base station to reduce the judgement errors of the code word. Thus, it reduces the probability that the transmitting base station judges itself to be the non-transmitting base station and stops the transmission due to the judgement error so that the reception quality of the downlink can be improved.

A fourth embodiment of the present invention will be described hereafter. The principle that forms the basis of the fourth embodiment is, in the base station for having the link set up just as in the third embodiment, to reduce the code judgement errors by limiting the judgement candidates based on the information on the base stations on which the mobile station is currently setting up the links. As for the difference between the fourth embodiment and the third embodiment, in the third embodiment, each base station has in advance the information on the order of the base station identifiers that the base station control unit assigns to the base stations having the links set up, and if the base station control unit notifies the base station of the information on the link set-up base station number, the base station determines the base station identifiers that are currently used based on the information on the order and the number. On the other hand, in the forth embodiment, each base station does not have the information on the order of the base station identifiers that the base station control unit assigns. Instead, in the fourth embodiment, the base station control unit notifies the base station of the information on a set of the currently used base station identifiers. The currently used base station identifiers are the base station identifiers assigned to the base stations currently having the links set up.

Figure 10:
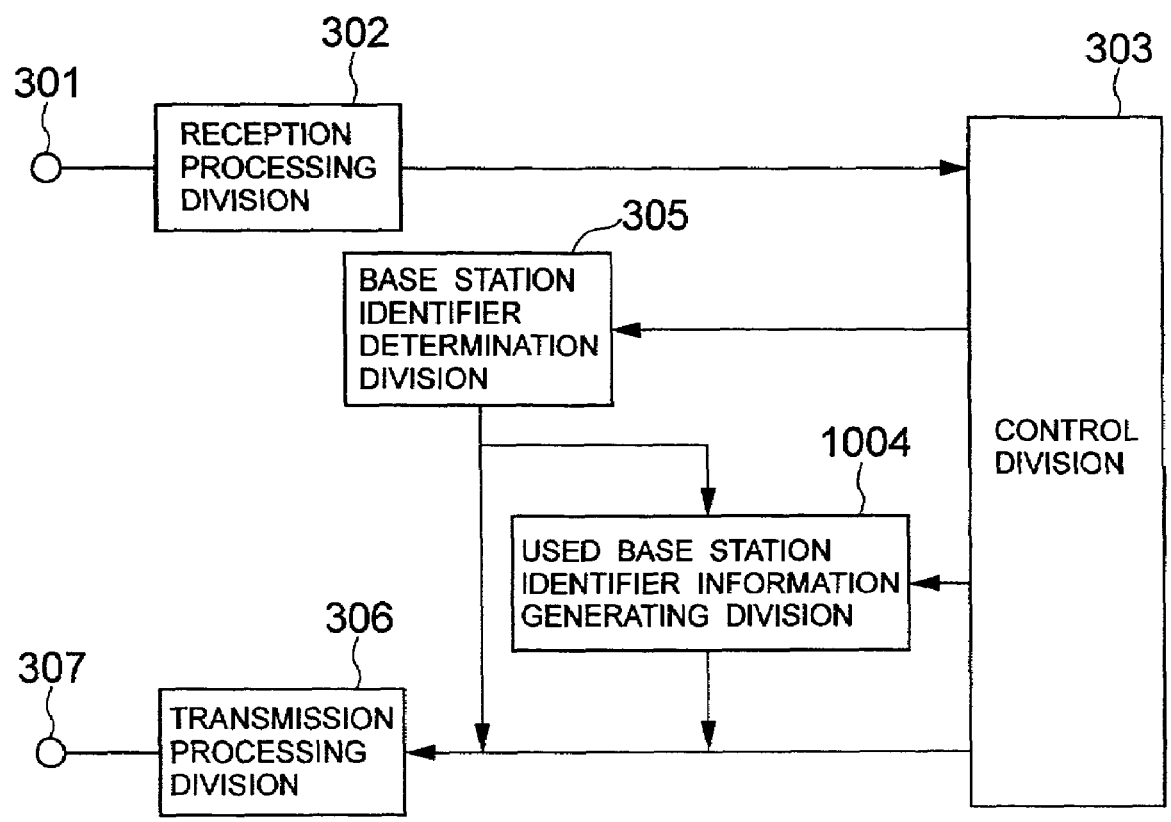
FIG. 10 is a block diagram showing a construction of a base station control unit according to a fourth embodiment of the present invention.
Figure 11:
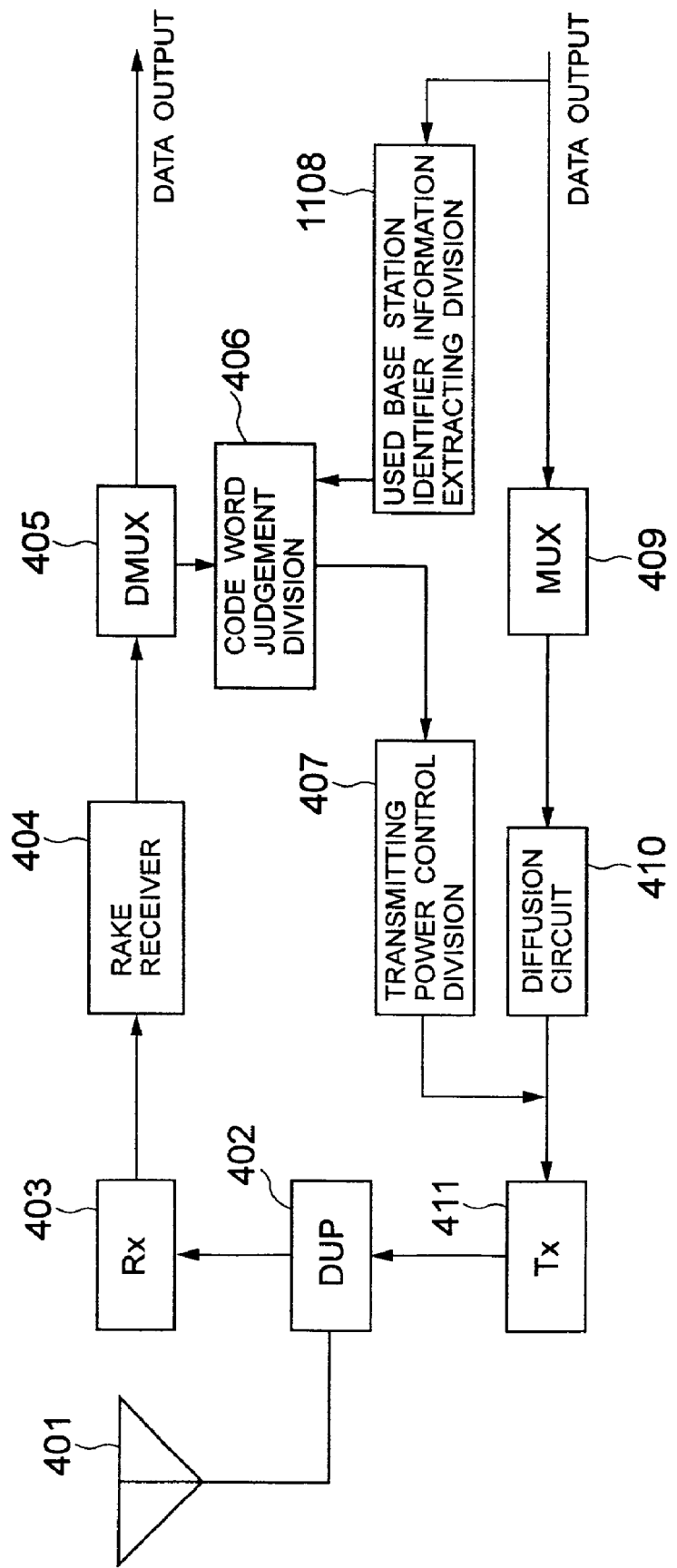
FIG. 11 is a block diagram showing a construction of a base station according to the fourth embodiment.

FIGS. 10 and 11 are block diagrams showing configurations of the base station control unit and the base station according to the fourth embodiment respectively, and the portions corresponding to FIGS. 3 and 4 are numbered likewise and duplicative descriptions are omitted. In addition, the cellular system to which this embodiment is applied is the same as that in FIG. 1. As shown in FIG. 10, the base station control unit does not have the maximum base station number information generating division 304 that the unit shown in FIG. 3 has. Instead, it has a used base station identifier information generating division 1004 that the unit in FIG. 3 does not have. The used base station identifier information generating division 1004 generates the information on the base station identifiers assigned to the base stations currently having the links set up, and notifies it by multiplexing it into the data outputted to each base station to have the link set up each time the link set-up base station number changes. The operations of the other components in FIG. 10 are performed just as the operation of the base station control unit in FIG. 3.

As shown in FIG. 11, the base station does not have the maximum base station number information extracting division 408 that the base station shown in FIG. 4 has. Instead, it has a used base station identifier information extracting division 1108 that the base station in FIG. 4 does not have. The used base station identifier information extracting division 1108 extracts the information on the currently used base station identifiers notified from the base station control unit and sends it to the code word judgement division 406. The operations of the other components in FIG. 11 are performed just as the operation of the base station in FIG. 4.

Thus, according to the fourth embodiment of the present invention, the base station control unit notifies each base station to have the link set up of the information on the base station identifiers assigned to the base stations currently setting up the links. The base station can limit the code word judgement candidates that may be received based on that information. Accordingly, it is possible to increase the distance between the codes among the code words to be the judgement candidates so as to consequently reduce the judgement errors of the code word in the base station. Thus, it reduces the probability that the transmitting base station judges itself to be the non-transmitting base station and stops the transmission due to the judgement error so that the reception quality of the downlink can be improved.

Figure 12:
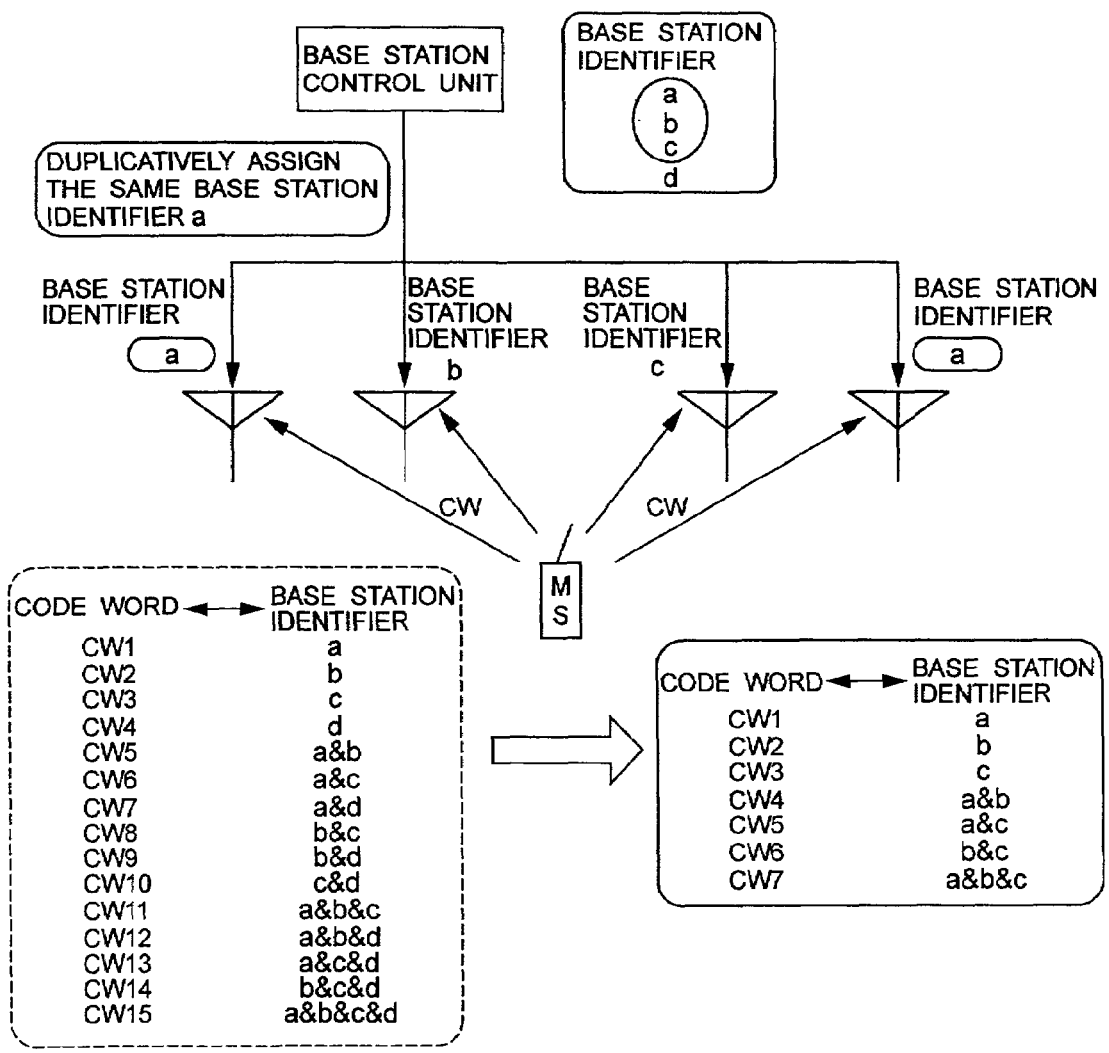
FIG. 12 is a diagram showing a principle that forms the basis of a fifth embodiment of the present invention.

A fifth embodiment of the present invention will be described hereafter. FIG. 12 is a diagram showing a principle that forms the basis of the fifth embodiment. In the fifth embodiment, the base station control unit determines to duplicatively use the same base station identifier in the case where the mobile station sets up lines with the base stations of the predetermined base station number threshold or more. As shown in FIG. 12, while the predetermined base station number threshold is three, the mobile station has links set up with four base stations. Accordingly, when the fourth base station has the link set up, the base station control unit determines the base station identifier to be assigned to the fourth base station out of three base station identifiers already being used. At this time, if the mobile station specifies one of the base stations using the same base station identifier as the transmitting base station, both of them are specified as the transmitting base stations on the basis of the code word from the mobile station to perform the transmission. Accordingly, a diversity effect due to multiple transmission becomes more significant on simultaneous transmission by assigning to the forth base station the same base station identifier as that of the base station of as small a difference in the propagation loss as possible.

Normally, as for handover between sectors, distance attenuation, shadowing or the like between the mobile station and each base station in the same cell is the same because the location of each base station is the same, and so it is thinkable that the difference in the propagation loss is small. Accordingly, in the case where the base station identifier is already assigned to the one base station in the cell and a duplicative base station identifier must be assigned to the other base station in the cell because the link set-up base station number is the base station number threshold or more, the base station identifier of the one base station is duplicatively assigned to the other base station. In the case where a duplicative base station identifier must be simply assigned, the same base station identifier as that of the base station of as small a difference in the propagation loss as possible should be assigned. Thus, it is possible to limit the base station identifiers to be used to three in FIG. 12. Accordingly, it is also possible to reduce the number of the code words showing these combinations so as to consequently reduce the number of the code words to be the judgement candidates when judging the received code word at the base station.

Figure 13:
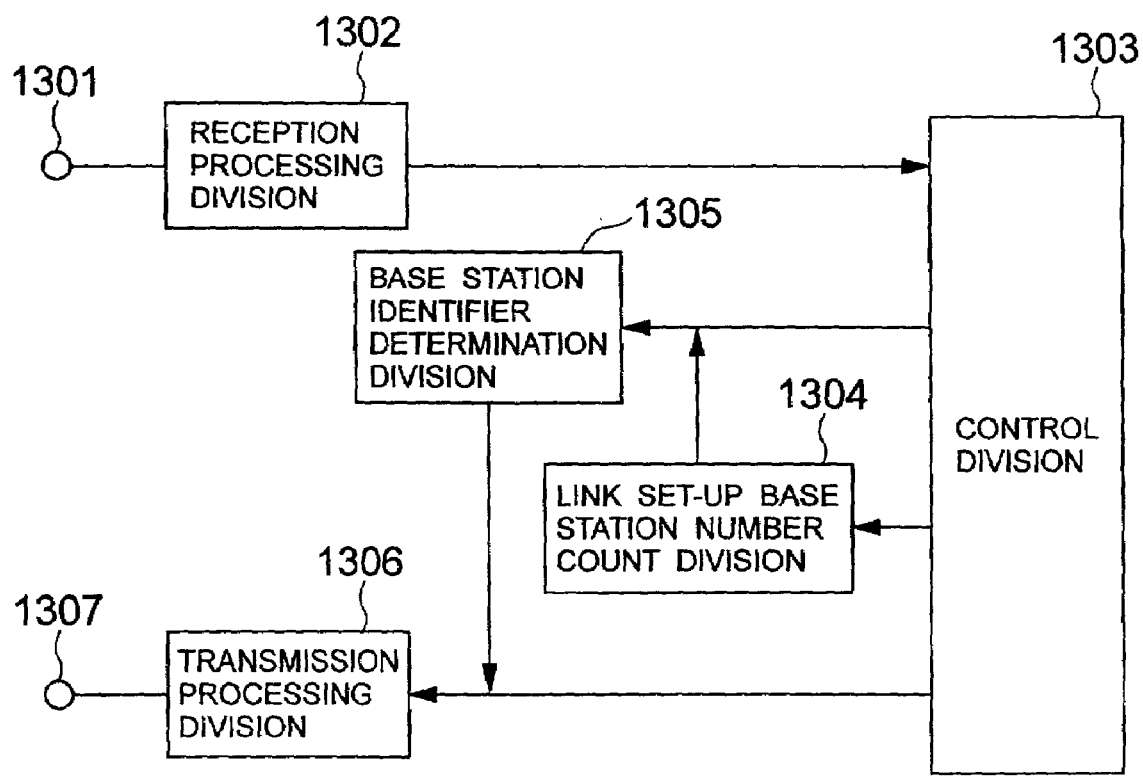
FIG. 13 is a block diagram showing a construction of a base station control unit according to the fifth embodiment.

FIG. 13 is a block diagram showing the construction of the base station control unit according to the fifth embodiment. As shown in FIG. 13, the base station control unit is comprised of an input terminal 1301 for receiving the signal transmitted from the base station, a reception processing division 1302, a control division 1303 for performing various control on transmission and reception of the base station, a link set-up base station number count division 1304, abase station identifier determination division 1305 for determining the base station identifier of the base station to have the link set up, a transmission processing division 1306 and an output terminal 1307 for transmitting the signals to each base station.

The link set-up base station number count division 1304 counts the number of the base stations on which the mobile station has the links set up, and when the link set-up base station number changes, it notifies the base station identifier determination division 1305 thereof. While the base station identifier determination division 1305 determines the base station identifier of the base station to have the link set up and notifies the information on the determined base station identifier by multiplexing it into the data outputted to the base station, it determines the base station identifier of the base station out of the base station identifiers already being used in the case where the link set-up base station number is the predetermined base station number threshold or more. In this case, if the base station of the same cell as that of the base station of which identifier is to be newly determined has already the base station identifier assigned, that identifier is used, and if not, it uses the same base station identifier as that of the base station of as small a difference in the propagation loss as possible. However, duplicative assignment is evenly performed so that the number of the base stations duplicatively using the base station identifier becomes as small as possible, and reassignment is performed if there is the base station disconnecting the link.

Figure 14:
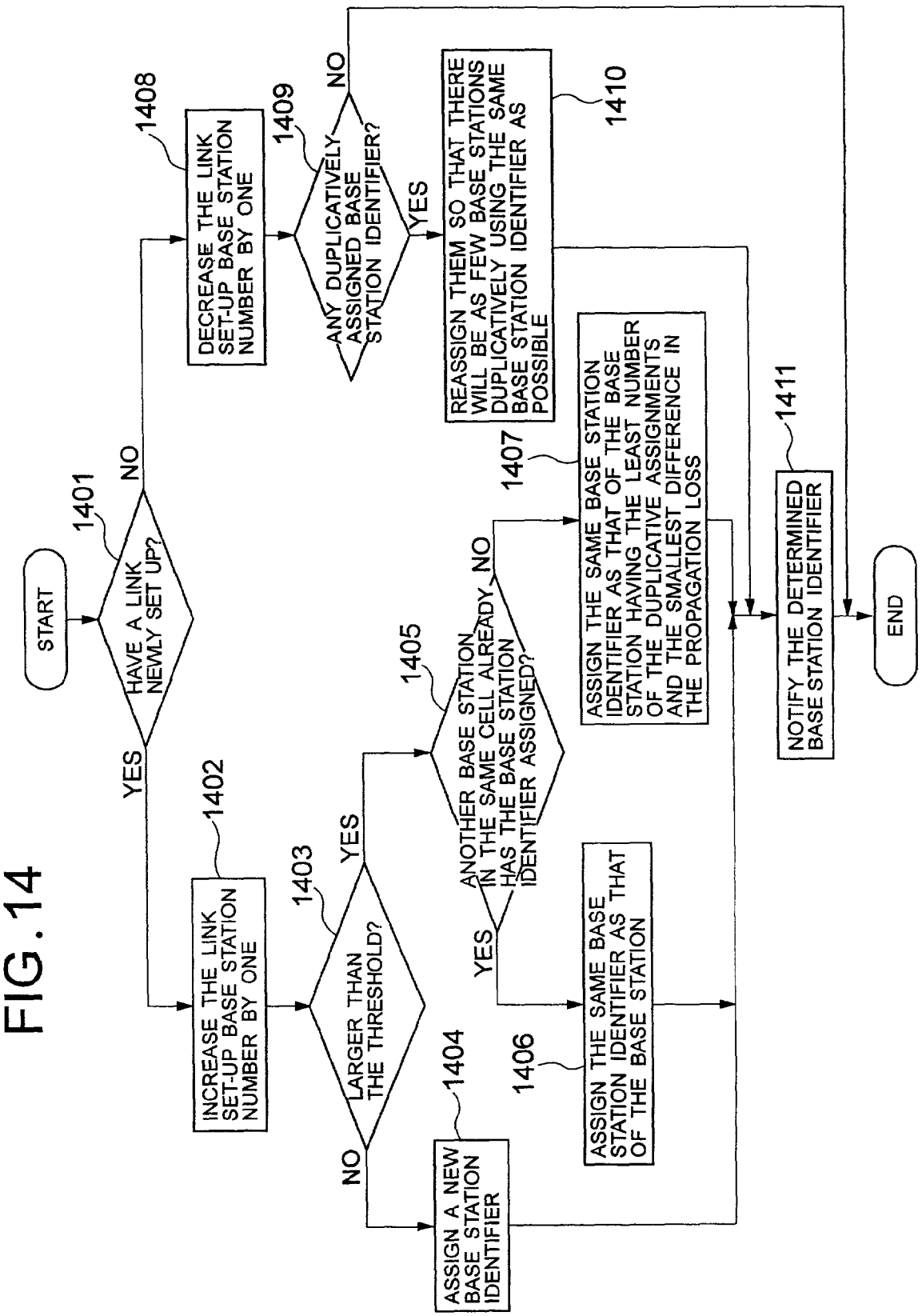
FIG. 14 is an operation flowchart on a method of determining base station identifiers in the case where the link set-up base station number has changed in the base station control unit according to the fifth embodiment.

FIG. 14 is an operation flowchart on the method of determining the base station identifier in the case where the link set-up base station number has changed in the base station control unit according to the fifth embodiment. As shown in FIG. 14, in the case where there arises the base station to newly have the link set up (step 1401, YES), the base station control unit increases the link set-up base station number counted on the link set-up base station number counter by one (step 1402), and compares the link set-up base station number to the predetermined base station number threshold (step 1403).

In the case where the link set-up base station number is smaller than the base station number threshold (step 1403, NO), the base station control unit assigns a new base station identifier (step 1404), and in the case where the link set-up base station number is larger than the base station number threshold (step 1403, YES), the base station control unit duplicatively assigns the base station identifier that is already used. At this time, if another base station that is in the same cell as the base station to newly have the link set up already has the base station identifier assigned (step 1405, YES), the base station control unit determines to use the same base station identifier as that of the base station in the same cell (step 1406), and in any other case (step 1405, NO), the base station control unit determines to use the same base station identifier as that of the base station having the least number of the duplicatively used base stations and the smallest difference in the propagation loss (step 1407).

On the other hand, in the case where there arises the base station to disconnect the link (step 1401, NO), the base station control unit decreases the link set-up base station number counted on the link set-up base station number counter by one (step 1408), and determines whether or not there is any duplicatively used base station identifier (step 1409). In the case where there is the duplicatively used base station identifier (step 1409, YES), the base station control unit reassigns the base station identifiers so that there will be as few duplicatively used base stations as possible (step 1410). Each of the base station identifiers determined in the steps 1404, 1406, 1407 and 1410 is notified by multiplexing it into output data to the base station to which it is assigned (step 1411).

Thus, according to the fifth embodiment of the present invention, in the case where the link set-up base station number becomes the predetermined threshold or more, the base station identifier already being used is duplicatively used. It is thus possible to limit the base station identifiers to be used, and it is accordingly possible to limit the number of the code words that may be used so as to reduce the judgement errors of the received code word at each base station.

In the case of duplicatively using the base station identifier, if one of the duplicatively used base stations is specified as the transmitting base station by the mobile station, all the duplicatively used base stations are specified as the transmitting base stations, so that it is thinkable that the base stations which are non-transmitting base stations in reality perform the transmission, resulting in increase in the interference. However, the number of the base stations to have the links set up simultaneously is usually two on three or so, and so it is possible, by setting the base station number threshold equal to or larger than that, to render the possibility of occurrence of such a state very low. Accordingly, a link capacity is hardly reduced by the increase in the interference so that the reception quality of the downlink can be improved by reducing the judgement errors of the received code word at each base station.

As described above, in the present invention, the base station control unit notifies each base station of the information on the maximum number of the base stations on which the mobile station may set up the links or the information on the base stations on which the mobile station currently has the links set up. It is thus possible for each base station having the link set up to determine the code words that may be used out of those associated with the combinations of the base station identifiers in advance. Accordingly, when judging whether or not the base station itself is specified from the code word received on the uplink, it is possible to make a judgement by limiting the candidates only to the code words that may be used so as to have the effect of reducing the judgement errors of the received code word at the base station.

In addition, in the case where the number of the base stations having the links set up with the mobile station is equal to or exceeding the predetermined base station number in the present invention, the same base station identifier is used by the plurality of base stations. In particular, the probability is high that the number of the base stations which are the subjects of the soft handover will be two or three while the probability is low that it will be more than that, and so it is possible, by rendering the predetermined threshold four or more, to limit the number of the base station identifiers to be used and limit the number of the code words that may be used without substantially causing the increase in the interference by the duplicative use. Accordingly, when judging whether or not the base station itself is specified as the transmitting base station, the number of the code words that are judgement candidates decreases so as to have the effect of reducing the judgement errors of the received code word.

Thus, according to the present invention, it is possible to reduce the judgement errors at the base stations and perform precise base station specification when notifying the base station specified as the transmitting base station out of the base stations having the links set up by the mobile station. Accordingly, it is possible to obtain the effect of reducing the probability that the base station specified to perform the transmission makes the judgement errors and stops the transmission so as to improve the downlink reception quality.

What is claimed is:

1. A cellular system in a code division multiple access mode comprising:
   a mobile station for measuring reception quality of pilot signals transmitted by a plurality of base stations and setting up radio links; and
   a base station control unit for assigning unique information to the base stations there under and determining sequence information on the assignment,
   wherein each of said base stations is operable to check a code word transmitted from the mobile station having the radio link set up and associated with said base stations unique information against a table created based on information notified by the base station control unit and determine a transmitting base station, wherein:
   said base station control unit has means for notifying each base station of said base stations, in advance, of said unique information and said sequence information; and
   each of said base stations has means for judging whether or not each of said base stations itself is specified as the transmitting base station by creating in advance code word candidates configured to be transmitted by the mobile station based on said unique information and said sequence information and checking the code word received from the mobile station against said code word candidates.

2. The cellular system according to claim 1, wherein a maximum number of the base stations on which the mobile station is configured to set up links is used as said sequence information.

3. The cellular system according to claim 1, wherein a set of the base station identifiers used according to a maximum number of the base stations on which the mobile station is configured to set up links is used as said sequence information.

4. The cellular system according to claim 1, wherein the number of the base stations on which the mobile station currently has links set up is used as said sequence information.

5. The cellular system according to claim 1, wherein a set of the base station identifiers used by the base stations currently having links set up is used as said sequence information.

6. A cellular system in a code division multiple access mode comprising:
   a mobile station for measuring reception quality of pilot signals transmitted by a plurality of base stations and setting up radio links; and
   a base station control unit for assigning code words and base station identifiers that are unique information to the base stations thereunder and determining sequence information on the base station identifiers,
   wherein each of said base stations is operable to check the code word transmitted from the mobile station having the radio link set up against a table created based on correspondence between said assigned code words and said assigned base station identifiers and said sequence information and determine a transmitting base station, wherein:
   said base station control unit has means for notifying each base station of said base stations, in advance, of said assigned code words and said assigned base station identifiers and said sequence information; and
   each base station has means for judging whether or not each of said base stations itself is specified as the transmitting base station by creating in advance code word candidates configured to be transmitted by the mobile station based on said assigned base station identifiers and said sequence information and checking the code word received from the mobile station against said code word candidates.

7. A cellular system in a code division multiple access mode comprising:
   a mobile station for measuring reception quality of pilot signals transmitted by a plurality of base stations and setting up radio links; and
   a base station control unit for assigning code words and base station identifiers that are unique information of the base stations thereunder and determining a predetermined base station number threshold, wherein each of said base stations is operable to check the code word transmitted from the mobile station having the radio link set up against a table created based on correspondence between said assigned code words and said assigned base station identifiers and said base station number threshold and determine a transmitting base station, wherein:

said base station control unit has means for, in the case where the mobile station sets up links with the base stations equal to or exceeding said base station number threshold, duplicatively assigning a base station identifier to at least two of said base stations and notifying said base stations, in advance, of said duplicatively assigned base station identifier, said assigned code words and said base station number threshold; and each of said base stations has means for, in the case where the mobile station sets up links with the base stations equal to or exceeding said base station number threshold, judging whether or not each of said base stations itself is specified as the transmitting base station by creating in advance code word candidates configured to be transmitted by the mobile station based on said duplicatively assigned base station identifier and said base station number threshold and checking the code word received from the mobile station against said code word candidates.

8. A cellular system using a code division multiple access mode and comprising a mobile station, base stations having radio links set up with said mobile station and a base station control unit assigning base station identifiers to said base stations in a predetermined order, wherein:

said base station control unit has first means for notifying each base station of a maximum base station number that is a maximum number of the base stations which have the radio links set up with said mobile station; and said mobile station has second means for measuring reception quality of pilot signals transmitted by said base stations, determining one transmitting base station or a plurality of transmitting base stations out of said base stations according to measuring results thereof, and transmitting to each base station a code word indicating a combination of the base station identifiers of said transmitting base stations, wherein each of said base stations has third means for judging whether or not each of said base stations is specified as the transmitting base station by determining judgement candidates that are the code words configured to be transmitted by said mobile station based on said predetermined order and said maximum base station number and checking the code word received from said mobile station against said judgment candidates.

9. A cellular system using a code division multiple access mode and comprising a mobile station, base stations having radio links set up with said mobile station and a base station control unit assigning base station identifiers to said base stations in a predetermined order, wherein:

said base station control unit has first means for determining the base station identifiers used according to said maximum base station number having radio links set up with said mobile station and for notifying each base station of the determined base station identifiers;

said mobile station has second means for measuring reception quality of pilot signals transmitted by said base stations, determining one transmitting base station or a plurality of transmitting base stations out of said base stations according to measuring results thereof, and transmitting to each base station a code word indicating a combination of the base station identifiers of said transmitting base stations; and each of said base stations has third means for judging whether or not each of said base stations is specified as the transmitting base station by determining judgement candidates that are the code words configured to be transmitted by said mobile station based on the determined base station identifiers and checking the code word received from said mobile station against said judgment candidates.

10. A cellular system using a code division multiple access mode and comprising a mobile station, base stations having radio links set up with said mobile station and a base station control unit assigning base station identifiers to said base stations having the radio links set up, wherein:

said base station control unit has means for, in the case where the number of said base stations is a predetermined base station number threshold or more, duplicatively assigning a base station identifier that is already assigned;

said mobile station has means for measuring reception quality of pilot signals transmitted by said base stations, determining one transmitting base station or a plurality of transmitting base stations out of said base stations according to measuring results thereof, and transmitting to each base station a code word indicating a combination of the base station identifiers of said transmitting base stations; and each of said base stations has means for judging whether or not said each of said base stations is specified as the transmitting base station by checking the code word received from said mobile station against code words indicating combinations of said base station identifiers of said base stations.

11. A base station specification method in a cellular system using a code division multiple access mode, the method comprising:

measuring reception quality of pilot signals transmitted by a plurality of base stations and setting up radio links, assigning unique information of the base stations thereunder and determining sequence information on the assignment, notifying each base station of said unique information and said sequence information; and checking a code word transmitted from a mobile station having the radio links set up and associated with said base stations unique information against a table created based on the unique information and sequence information notified by a base station control unit and determining a transmitting base station, judging whether or not each of said base stations is specified as the transmitting base station by creating in advance code word candidates configured to be transmitted by the mobile station based on said unique information and said sequence information and checking the code word received from the mobile station against said code word candidates.

12. A base station specification method in a cellular system using a code division multiple access mode, the method comprising:

measuring reception quality of pilot signals transmitted by a plurality of base stations and setting up radio links, assigning code words and base station identifiers that are unique information of the base stations thereunder and determining sequence information on the base station identifiers, notifying each base station, in advance, of said assigned code words and said assigned base station identifiers and said sequence information;

checking the code word transmitted from a mobile station having the radio link set up against a table created based on correspondence between said assigned code words and said assigned base station identifiers and said sequence information and determining a transmitting base station, and judging whether or not said each base station itself is specified as the transmitting base station by creating in advance code word candidates configured to be transmitted by the mobile station based on said assigned base station identifiers and said sequence information and checking the code word received from the mobile station against said code word candidates.

13. The base station specification method according to claim 11, wherein a maximum number of the base stations on which the mobile station is configured to set up links is used as said sequence information.

14. The base station specification method according to claim 11, wherein a set of base station identifiers that used according to a maximum number of the base stations on which the mobile station is configured to set up links is used as said sequence information.

15. The base station specification method according to claim 11, wherein a number of the base stations on which the mobile station currently has links set up is used as said sequence information.

16. The base station specification method according to claim 11, wherein a set of the base station identifiers used by the base stations currently having links set up is used as said sequence information.

17. A base station specification method in a cellular system using a code division multiple access mode, the method comprising:

measuring reception quality of pilot signals transmitted by a plurality of base stations and setting up radio links, assigning code words and base station identifiers that are unique information corresponding to respective the base stations thereunder and determining a predetermined base station number threshold, and checking the code word transmitted from a mobile station having the radio link set up against a table created based on correspondence between said assigned code words and said assigned base station identifiers and said base station number threshold and determining a transmitting base station, wherein:

duplicatively assigning a base station identifier of the assigned base station identifiers to at least two of said base stations having the radio link set up and notifying said base stations, in advance, of said duplicatively assigned base station identifier, said assigned code words and said base station number threshold; and judging whether or not each of said base stations itself is specified as the transmitting base station by creating in advance code word candidates configured to be transmitted by the mobile station based on said duplicatively assigned base station identifier and said base station number threshold and checking the code word received from the mobile station against said code word candidates.

18. A base station specification method in a cellular system using a code division multiple access mode and including a mobile station, base stations having radio links set up with said mobile station and a base station control unit assigning base station identifiers to said base stations in predetermined order, the method comprising:

notifying each base station of said base stations of the maximum base station number that is the maximum number of the base stations which have the radio links set up with said mobile station;

measuring reception quality of pilot signals transmitted by said base stations, determining one transmitting base station or a plurality of transmitting base stations out of said base stations according to measuring results thereof, and transmitting to each base station a code word indicating a combination of the base station identifiers of said transmitting base stations; and judging whether or not the base station is specified as the transmitting base station by determining judgment candidates that are the code words configured to be transmitted by said mobile station based on said order and said maximum base station number and checking the code word received from said mobile station against said judgement candidates.

19. A base station specification method in a cellular system using a code division multiple access mode and including a mobile station, base stations having radio links set up with said mobile station and a base station control unit assigning base station identifiers to said base stations in predetermined order, the method comprising:

determining the base station identifiers used according to a maximum base station number and notifying each base station of the determined base station identifiers;

measuring reception quality of pilot signals transmitted by said base stations, determining one transmitting base station or a plurality of transmitting base stations out of said base stations according to measuring results thereof, and transmitting to each base station a code word indicating a combination of the base station identifiers of said transmitting base stations; and judging whether or not said each of said base station is specified as the transmitting base station by determining judgment candidates that are the code words configure to be transmitted by said mobile station based on the determined base station identifiers and checking the code word received from said mobile station against said judgment candidates.

20. A base station specification method in a cellular system using a code division multiple access mode and including a mobile station, base stations having radio links set up with said mobile station and a base station control unit assigning base station identifiers to said base stations in predetermined order, the method comprising:

notifying each base station of said base stations of a link set-up base station number that is the number of said base stations having links set up, instead of a maximum base station number;

measuring reception quality of pilot signals transmitted by said base stations, determining one transmitting base station or a plurality of transmitting base stations out of said base stations according to measuring results thereof, and transmitting to each base station a code word indicating a combination of the base station identifiers of said transmitting base stations; and judging whether or not a base station is specified as the transmitting base station by determining judgment candidates that are the code words configured to be transmitted by said mobile station based on said order and said link set-up base station number and checking the transmitted code word against said judgment candidates.

21. A base station specification method in a cellular system using a code division multiple access mode and including a mobile station, base stations having radio links set up with said mobile station and a base station control unit assigning base station identifiers to said base stations having the radio links set up, the method comprising:

duplicatively assigning a base station identifier that is already assigned;

measuring reception quality of pilot signals transmitted by said base stations, determining one transmitting base station or a plurality of transmitting base stations out of said base stations according to measuring results thereof, and transmitting to each base station of said base stations a code word indicating a combination of the base station identifiers of said transmitting base stations; and judging whether or not said each of said base stations is specified as the transmitting base station by checking the code word received from said mobile station against code words indicating combinations of said base station identifiers of said base stations.

\* \* \* \* \*